United States Patent [19]

Valles et al.

[11] 4,267,735
[45] May 19, 1981

[54] GYRO MOTOR CONTROL SYSTEM

[75] Inventors: Henry Valles, Rockaway; Allen R. Taylor, Nutley; Thomas Beneventano, Washington Towship, Bergen County, all of N.J.

[73] Assignee: The Singer Company, Little Falls, N.J.

[21] Appl. No.: 51,764

[22] Filed: Jun. 25, 1979

[51] Int. Cl.³ .............................................. G01C 19/10
[52] U.S. Cl. .......................................... 74/5.7; 318/3; 318/701
[58] Field of Search .................... 74/5.7, 5.47; 318/3, 318/701, 703, 712, 717

[56] References Cited
U.S. PATENT DOCUMENTS 3,238,432  3/1966  Amberger ............................. 74/5.7
3,264,881  8/1966  Poklar et al. ......................... 74/5.7
3,354,726  11/1967 Krupick et al. .................... 74/5.7 X
3,438,270  4/1969  Binder et al. ........................ 74/5.47
3,702,569  11/1972 Quinn et al. ........................ 74/5.7 X Primary Examiner—Rodney H. Bonck
Attorney, Agent, or Firm—Thomas W. Kennedy

[57] ABSTRACT

A gyroscope with a solid rotor synchronous motor having three-phase square wave supply voltage is provided, and control circuitry including logic circuit components for periodically producing an amplitude modulation in the motor excitation voltage of constant frequency that results in a periodic slipping of a few degrees of the solid rotor relative to the electrical field is provided, whereby gyro drift errors varying sinusoidally in sense and magnitude in accordance with the relative rotation between field and rotor, balance out during each complete cycle of relative rotation.

8 Claims, 6 Drawing Figures

GYRO MOTOR CONTROL SYSTEM

The Government has rights in this invention pursuant to Contract No. F04701-76-C-0100 awarded by the Department of the Air Force.

BACKGROUND OF THE INVENTION

The present invention relates to instrument gyros of the high precision type such as, for example, those used in relation to a reference or origin point. The present invention relates particularly to a gyroscope motor control system, which minimizes motor on-off drift errors by an amplitude modulation of the motor excitation voltage.

A long-standing problem in the operation of instrument gyros has been drift error. In addition to the usual calculated gyro precession or normal drift, so-called "random drift" errors are also present. Some of these errors are unavoidable such as those due to basic bearing resistance; other random type drift errors appear to be characteristic of the type of gyro in question.

Such a drift error appears to be characteristic of most solid rotor synchronous motor gyroscopes. Here, it was found that when the gyro was initially turned on and the rotor had become electrically locked in synchronism with the field, a small drift error that remained uniform or constant during rotor-field lock, was produced in addition to the basic random drift; however, this error although constant during a given synchronous operation of the gyro, tended to be different in an apparently random manner for each subsequent on-off operation of the gyro.

A prior art motor control system for minimizing such drift error is shown in U.S. Pat. No. 3,702,569, which is assigned to the same assignee as this application. In such a prior art motor control system, a phase shift in the motor excitation voltage is produced which results in a relative slip of the field relative to the rotor.

One problem with such prior art motor control system is that it requires a relatively high power input. Another problem with such prior art system is that it develops a relatively high temperature around the motor causing a relatively high temperature gradient inside the gyro. Another problem with such prior art system is that if the phase advance is set at a relatively small angle, the rotor does not fall out of synchronism with the field but tends to hunt about the new position; and if the phase angle is set at a relatively large angle, the rotor does not have a smooth and well defined retardation relative to the field. Another problem with such prior art system is that it causes current spikes when its abrupt frequency change occurs, which interfere with the connecting circuits.

SUMMARY OF THE INVENTION

In accordance with one embodiment of the present invention, the drift characteristics of a solid rotor, synchronous motor gyroscope are improved by eliminating the net drift effect incident to on-off operation of the gyro, and the above-mentioned problems of the prior art motor control system are minimized, by using a control system having an AC motor excitation voltage, which is repetitively modulated, and which provides a notch voltage in a constant frequency AC wave envelope, which is lower than its back EMF voltage. The resulting repetitive slip of the rotor relative to the field due to a braking action on the rotor, improves the drift characteristics, while minimizing the above-mentioned problems of the prior art control system.

As the on-off drift error is proportional in magnitude to the sine of the phase angle between a fixed point on the rotor and cross-over (or 0° angle) of the electrical field, the braking action on the rotor relative to the field results in an orderly sinusoidal variation of the on-off drift error, which balance out effectively within a complete cycle of field rotation. With this new control system, the power input, thermal gradient and rotor hunting and current spikes are minimized.

Accordingly, it is one object of the invention to provide an improved gyro motor field excitation system having a modulated excitation voltage which avoids on-off drift effects in a solid rotor synchronous motor gyroscope and which minimizes the gyro power input and the gyro thermal gradient.

It is another object of the invention to provide the above-described field excitation system which produces a periodic notch voltage followed by an overvoltage, that periodically eliminates and then reestablishes the poles in the synchronous motor hysteresis ring thereby minimizing power input and thermal gradient and provides improved stability and performance.

It is another object of the invention to provide the above-described field excitation system having circuit means to selectively regulate the periods of the notch voltage and overvoltage and run voltage thereby providing a relatively large range of rotor slip angle size.

Other objects, features and advantages will appear from the following description with reference to the accompanying drawings.

DESCRIPTION OF PREFERRED EMBODIMENT

Figure 1:
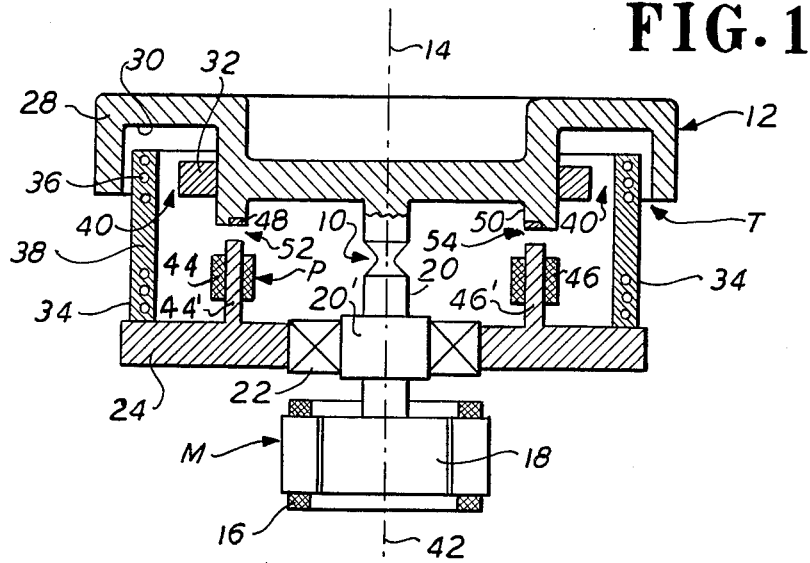
FIG. 1 is a partly sectional view of one form of synchronous motor gyroscope to which the present invention is applicable.

Referring to FIG. 1, one embodiment of the present invention is a two-axis gyro having a flexible coupling schematically indicated at 10 between the gyro wheel 12 and the drive or spin motor M. The spin axis of the gyro is indicated at 14. The spin motor is of synchronous type having a winding 16 and solid rotor 18, the latter being connected through a drive shaft 20 including the coupling 10, to the gyro wheel 12. The shaft is journalled at an enlarged portion 20' in bearing 22 that is mounted in a relatively fixed support or base plate 24 constituting part of the gyro casing or housing (not shown).

For providing two-axis freedom of movement, the shaft coupling 10 constitutes a suitable form of universal joint such for example, as that described in U.S. Pat. No. 3,354,726 for "Two-Axis Gyro", assigned to the same assignee as the present invention.

The configuration of the gyro wheel 12 lends itself to the functions of the functions of the torquer generally indicated at T and the pick-off at P. The peripheral portion 28 of the wheel is made of magnetic material and forms an annular channel 30 having an inverted U-shape cross-section as illustrated. A ring-type permanent magnet 32 (polarized at its inner and outer peripheries) is mounted on the inner peripheral wall of the channel 30 in operative relation to torquer coils generally indicated at 34. The torquer coil windings 36, one for each quadrant, are embedded in an insulating cylinder 38 that extends in telescopic manner partly into the channel 30 and into an annular gap 40 formed between the outer channel wall and ring magnet 32. The coil-supporting cylinder 38 is mounted on the main support 24 in concentric relation to the longitudinal axis 42 of the rotor shaft 20. This axis and the spin axis 14 are in alignment when the gyro wheel is in a null position, as shown.

When precession of the spin axis is detected by the pick-off P, the resulting signal causes correcting torque to be applied to the wheel in obvious manner according to respective energization of torquer quadrant windings and interaction of the respective magnetic fields in the gap 40.

The pick-off signal device comprises a plurality of peripherally spaced coils 44, 46, etc., that are mounted on the support 24, and a relatively movable permanent magnet-ring 48. This magnet is mounted on the gyro wheel at 50 in concentric relation to the torquer magnet 32, and is vertically aligned with the peripherally spaced magnet cores 44',46', etc. of the pick-off coils 44 and 46 respectively, to form air gaps 52, 54, etc., that are equal length in the null position of the gyro. Precession (tilting) of the wheel 12 (and spin axis) with consequent air gap variations, produces unequal coil voltages and a resultant pick-off signal.

For the purposes of this invention, further descriptions of the torquer and pick-off arrangements are not essential; for more detailed descriptions thereof, reference is made to U.S. Pat. No. 3,438,270 for "Two-Axis Torquer" assigned to the same assignee as the present invention.

Figure 2:
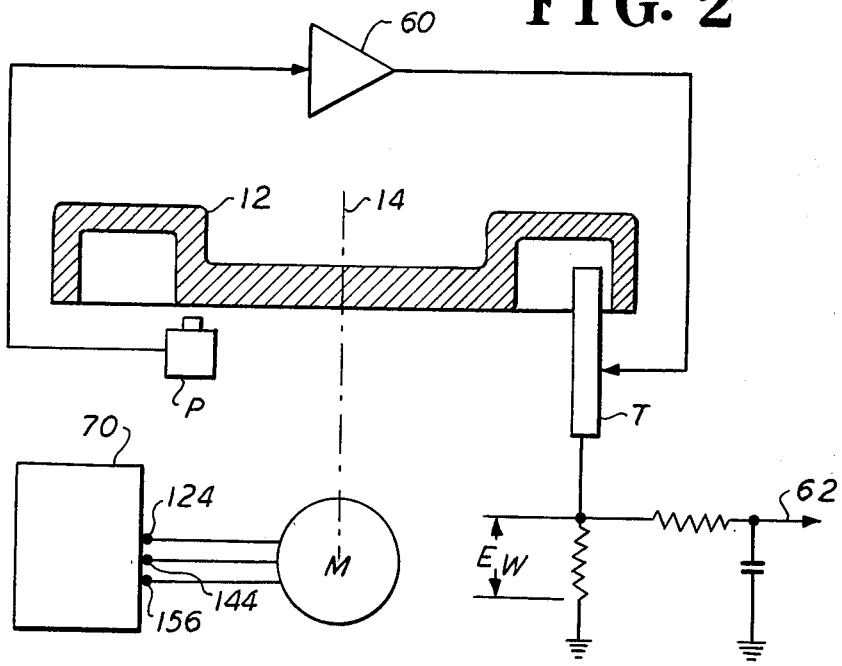
FIG. 2 is a schematic diagram generally illustrating a gyro control system embodying the invention.

A gyro control system embodying the invention and including a gyro such as that described above, is schematically shown in simplified form by FIG. 2. In the control mode shown by way of example, the gyro wheel 12 driven by the spin motor M is related to the pick-off P and torquer T in conventional manner; i.e. gyro precession is detected by the pick-off and resulting signal is amplified at 60 for causing the torquer to apply a correcting torque to the wheel. If a "rate capture" system is used, the torquer output can be represented by a potential $E_W$ for producing a read-out signal at 62, this signal corresponding to the total gyro drift rate W. This can be represented as made up of two components, i.e.

$$W = W_E + W_B$$

where $W_E$ is the drift rate due to on-off error, and $W_B$ is the basic random drift rate. The present invention is concerned with eliminating the error effect of $W_E$.

As explained in the prior art U.S. Pat. No. 3,702,569, which is assigned to the same assignee as this application, there was a predictable pattern within which the on-off drift occurred. The drift rates ranged between values defining positive and negative limits of about the same magnitude, and that the error-producing bias was related sinusoidally to the relative angular position of the synchronized field and a fixed point on the rotor.

Figure 4:
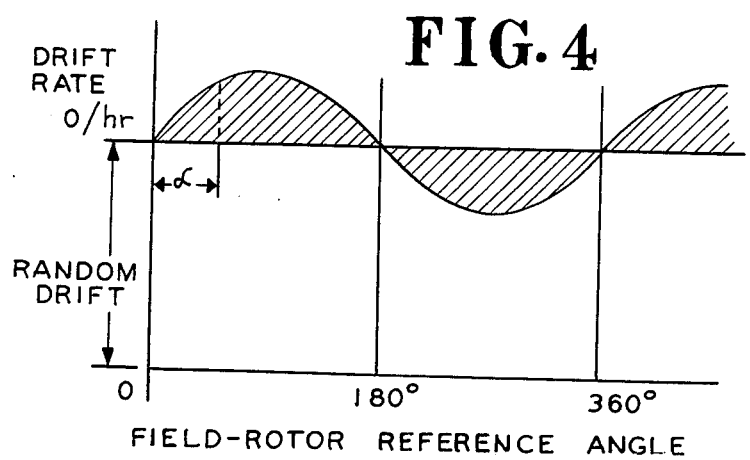
FIG. 4 is a graph of cyclic variation of on-off drift error as related to FIG. 3.
Figure 3:
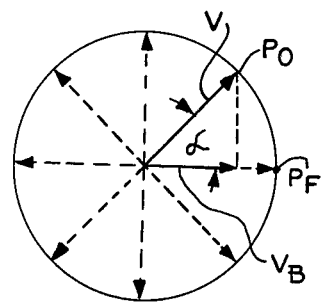
FIG. 3 is a circle diagram for illustrating vectorially gyro bias shifts.

For a graphical explanation of the relation between progressive phase shift and gyro bias resulting in the on-off drift error, reference is made to the diagrams of FIGS. 3 and 4. The circle diagram of FIG. 3 shows a free rotating bias vector V representing successive stepped re-synchronization positions of field and rotor.

Considering first the conventional situation wherein the bias for a given gyro operation remains constant, it will be assumed that point $P_O$ is the cross-over, or 0° position of the motor field on the rotor, and that $P_F$ is a fixed reference point on the rotor of the specific gyro in question. The bias vector V may be considered to be at point $P_O$, thereby defining angle oc between the vector and fixed point $P_F$. According to the relationship established above, the on-off drift bias for this situation is proportional to sin oc and remains constant during the gyro operation at a value represented by vector $V_B$. For the next gyro operation, the cross-over point might be at any angular position with respect to point $P_F$, and in such case the drift bias would depend in magnitude and in sence on the sine of the new angle so formed.

As explained in the above-mentioned prior art patent, the gyro motor control system must control, in an orderly rather than random manner, the position of point $P_O$, so that the bias vector V will progressively rotate to the evenly spaced angular positions as represented in FIG. 3 by dotted lines, so that there will be a resultant sinusoidal relationship of the gyro bias and angle oc as shown by FIG. 4. In this way, the drift error which corresponds to this bias, will tend to balance out over repeated cycles of substantially equal positive and negative values, so that only the basic random drift indicated at R remains.

Figure 5:
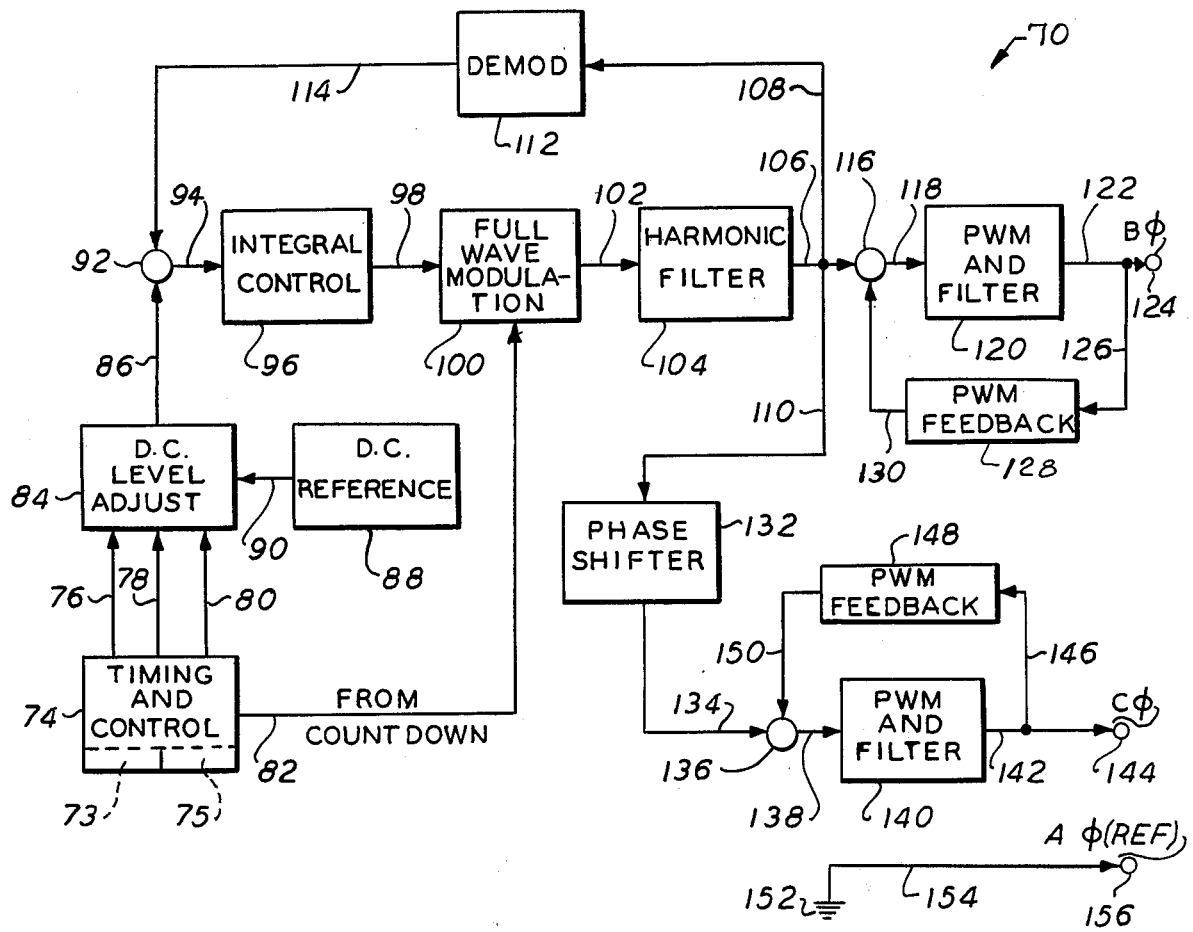
FIG. 5 is a flow-type diagram of the motor drive circuitry generally indicated in the control system of FIG. 2.
Figure 6:
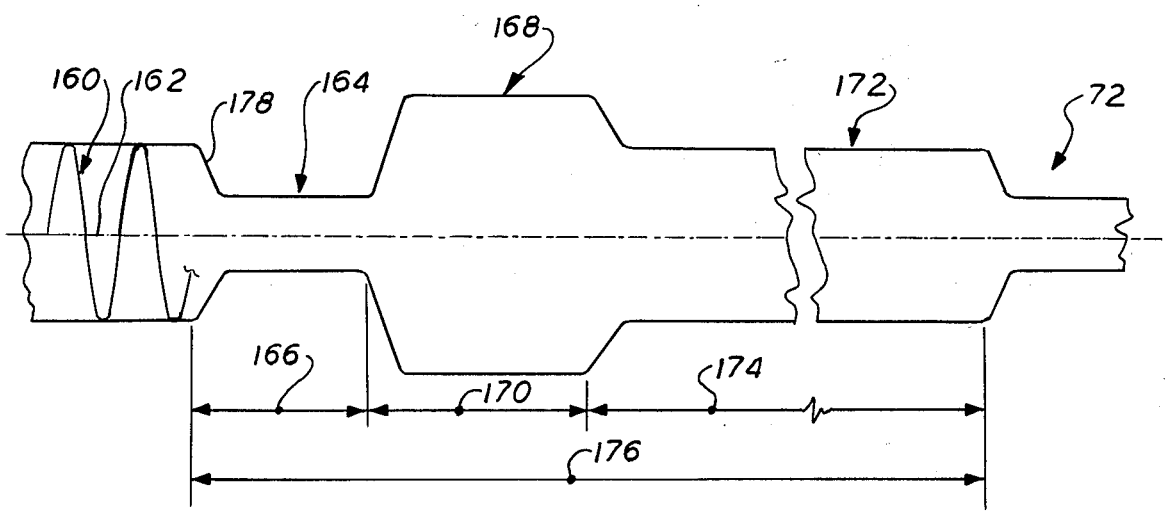
FIG. 6 shows an AC wave envelope drawing of the motor excitation voltage of the circuitry of FIG. 5.

According to the present invention, as shown in FIG. 5, a three-phase field excitation system 70 is provided which modulates a voltage, which produces an AC wave envelope 72, as shown in FIG. 6.

System 70 has a timing and control portion 74, which contains an oscillator 73 and countdown 75. Timing and control portion 74 provides a notch period output 76, and an overvoltage period output 78, and a run period output 80. Timing and control portion 74 also provides an excitation wheel frequency output 82. Pulses from outputs 76, 78 and 80, are fed to a DC level adjust portion 84, which has an output 86. A DC reference source 88 has an output 90 connected to DC level adjust portion 84. The pulses from outputs 76, 78 and 80 control a voltage provided to DC level adjust 84 through output 90 from DC reference source 88.

Output 86 of DC level adjust portion 84 is fed to a summer 92, which has an output 94 which is fed to an integral control portion, or integrator, 96. Integral control portion 96 has an output 98, which is fed to a full wave modulation portion 100. Output 82 of timing and control portion 74 feeds the wheel excitation frequency to full wave modulation portion 100. The DC level of output 98 from integral control portion 96 is modulated by the counted-down excitation frequency fed through output 82 from the timing and control portion 74.

An output 102 of full wave modulation portion 100 is filtered by harmonic filter 104 in order to provide a distortion-free excitation voltage, as shown in the AC wave envelope 72, in FIG. 6.

An output 106 of harmonic filter portion 104 is fed through connection 108 through a demodulator 112 through connection 114 to the summer 92. Summer 92 feeds through output 98 to the input of integral control portion 96, in order to provide a negative feedback for amplitude stability.

The output 106 of harmonic filter portion 104 is also connected to a pulse width modulated amplifier and filter portion 120, which is a power amplifier, to provide motor power for one phase B$\phi$ through output 122 to terminal 124.

Output 122 of pulse width modulated amplifier and filter portion 120 is fed through connection 126 to a pulse width modulated feedback portion 128 and then through connection 130 to summer 116.

Output 122 of pulse width modulated amplifier and filter portion 120 at terminal 124 connects to one winding of the motor M for driving the motor M.

Output 106 of harmonic filter portion 104 has a connection 110, which feeds to a phase shifter 132. Phase shifter 132 has an output 134, which feeds to another summer 136, that has an output 138. Output 138 feeds to another pulse width modulated amplifier and filter portion 140, which has an output 142 and termianl 144.

Output 142 of pulse width modulated amplifier and filter portion 140 at terminal 144 connects to another winding of motor M for driving motor M, and provides another output phase C$\phi$ for such winding of motor M.

Output 142 of pulse width modulated amplifier and filter portion 140 is fed through connection 146 to a pulse width modulated feedback portion 148, which feeds through connection 150 to summer 136.

A ground 152 has a connection 154 to a terminal 156 for providing phase A$\phi$. Three phases are provided; one phase is between A$\phi$ and phase B$\phi$; another phase is between phase B$\phi$ and phase C$\phi$; and another phase is between C$\phi$ and phase A$\phi$. Although this embodiment has three phases; the invention is applicable to other embodiments of other phases.

The AC wave envelope drawing 72, which is shown in FIG. 6, shows the wheel excitation frequency curve 160, that is provided by field excitation system 70. Wheel excitation frequency curve 160 has an axis of symmetry 162. Wheel excitation frequency curve 160 has a notch voltage 164, which occurs over a notch period 166. Wheel excitation frequency curve 160 also has an overvoltage 168, which occurs over an overvoltage period 170. Curve 160 also has a run voltage 172, which occurs over a run period 174. The sum of notch period 166, and overvoltage period 170, and run period 174, equals a total, repetitive interval 176.

Wheel excitation frequency curve 160 has a substantially constant frequency. The amplitude of wheel excitation frequency curve 160 changes to provide notch voltage 164 and overvoltage 168 and run voltage 172.

Notch voltage 164 is designed and calibrated to fit the particular gyro design characteristics. Notch voltage 164 is set, or designed, to be below, or less than, the back EMF voltage of the motor M. In this way, the rotor 18 of motor M has a smooth and definite retarding at the occurrence of notch voltage 164. Notch voltage 160 is designed and calibrated to have an amplitude decline 178, which is a gradual decline in the amplitude of wheel excitation frequency curve 160. In this way, because of the gradual amplitude decline 178 of wheel excitation frequency curve 160, a current spike is avoided. Thus, possible interference to an adjoining circuit is prevented due to the avoidance of a current spike.

Notch voltage 160 causes rotor 18 to be retarded thereby causing a braking action on rotor 18. Notch interval 166 and notch voltage 160 are set at specific values, thereby providing a definite control of the slippage angle of rotor 18.

Notch voltage 160 is preferably set at a specific value to be below the back EMF of motor M. Overvoltage 168 and run voltage 172 are set at specific values relative to the value of notch voltage 160. This arrangement minimizes the power input to motor M, as compared to the aforementioned prior art approach. Thus, power use is minimized and the temperature gradient of motor M is minimized.

In the operation of system 70, the modulated voltage wave form or envelope 72, which has repetitive intervals 176 is supplied to the motor M. Notch period pulses from notch period output 76, and run period pulses from run period output 80, and overvoltage period pulses from overvoltage period output 78, are supplied during each interval 176 to motor M. The DC level of output 98 from integral control portion 96 is modulated by the counted-down excitation frequency fed through output 82 from the timing and control portion 74. The notch voltage 164 is set to be below the back EMF voltage of the motor M. In this way, a braking action on the rotor 18 is caused, and a slip of rotor 18 relative to the field of winding 16 of motor M is caused, during each repetitive interval 176.

The overvoltage period pulses from overvoltage period output 78, which are supplied during each interval 176 to motor M, and the modulation of DC level of output 98 of integral control portion 96 by the frequency from output 82 of timing and control portion 74, follow the notch period pulses and precede the run period pulses in each interval 176. The overvoltage 168 is higher than the run voltage 172, which is higher than the notch voltage 166. In this way, the poles in the hysteresis ring of motor M can be eliminated during notch period 166 and reestablished during overvoltage period 170, so that the slip angle is precise and definite, and can be selected over a range for optimum performance. In addition, the poles in the hysteresis ring can be reestablished at a relatively stronger magnetic strength than in the prior art system, so that the power consumption of motor M is minimized, and the resulting temperature gradient adjacent motor M inside the gyro housing is also minimized.

Test data was obtained on four samples of a prototype gyro, which was a single-axis, floated gyro, that had an inner gimbal having a motor M. The four samples of the prototype gyro had the wheel indexing and field excitation system 70, of FIG. 5 in accordance with the present invention; and all of the aforementioned improvements resulted. The optimum parameters to achieve such improvements were also found, when testing the four samples of the prototype gyro, having the wheel indexing method and field excitation system 70.

Test data on the four samples, having the prototype gyro system 70, showed that there were certain optimum parameters. These parameters included a value of 4.25 VRMS for the notch voltage 164, a value of 53.3 MS for the notch period 166, a value of 15.8 VRMS for the overvoltage 168, a value of 66.7 MS for the overvoltage period 170, a value of 10.5 VRMS for the run voltage 172, a value of 733.0 MS for the run period, and a value of 853.0 MS for the repetitive interval. The envelope 72 for the test prototype gyro describes the amplitude function of the 1200 Hz drive frequency that was used.

Test data showed that the prototype gyro system 70 gave optimum drift characteristics, such as randomness and repeatability. In addition, the wheel run current was minimized. The test data showed that the wheel power of the system 70 was approximately 1.50 watts, versus approximately 2.0 watts for the prior art system.

While it is apparent that the embodiments of the invention herein disclosed is intended to fulfill the objectives of the invention, it will be appreciated that the invention is subject to modification without departing from the proper scope of the claims.

We claim:

1. In an instrument gyro system having a gyro wheel and a synchronous motor with solid rotor for driving the gyro wheel, the gyro system being characterized by a drift rate that remains uniform during a given synchronized period, and that is different in random manner for succeeding on-off gyro operations, the method of eliminating the error-effects of the aforesaid on-off gyro drift that comprises:

supplying a modulated voltage waveform having repetitive intervals to the motor, supplying notch period pulses and run period pulses to the motor during the intervals, supplying a notch voltage over a notch period and a run voltage over a run period during each repetitive interval, controlling the notch voltage so as to be lower than the back EMF voltage of the motor, thereby causing a braking action on the rotor and a position slip of the rotor relative to its motor field during each interval.

2. The method as specified in claim 1, and supplying overvoltage period pulses to the motor during the intervals, and supplying an overvoltage over an overvoltage period during each interval, supplying the overvoltage period following the notch period and preceding the run period, and controlling the overvoltage so as to be higher than the run voltage, thereby substantially eliminating the poles in the hysteresis ring of the motor during the notch period and reestablishing the poles in the hysteresis ring of the motor during the overvoltage period.

3. The method as specified in claim 1 wherein the braking action is achieved by changing the amplitude of the voltage.

4. A control system for an instrument gyro having a gyro wheel and a synchronous motor with solid rotor for driving the gyro wheel, the gyro being characterized by a drift rate that remains uniform during a given synchronized period, and that is different in random manner for succeeding on-off gyro operations, said control system comprising:

circuit means for supplying a modulated voltage waveform having repetitive intervals to the motor, pulse means for supplying notch period pulses and run period pulses during each interval, timing means for supplying a notch voltage over a notch period and a run voltage over a run period during each repetitive interval, control means for controlling the notch voltage so as to be lower than the back EMF voltage of the motor, whereby a braking action on the rotor and a positive slip of the rotor relative to the motor field during each interval is provided.

5. A control system as specified in claim 4, and including pulse means for supplying overvoltage period pulses to the rotor during the intervals, and including timing means for supplying an overvoltage in an overvoltage period during each interval, said timing means being adapted for supplying the overvoltage period following the notch period and preceding the run period, and control means for controlling the overvoltage so as to be higher than the run voltage, whereby the poles in the hysteresis ring of the motor are substantially eliminated during the notch period and are reestablished during the overvoltage period.

6. A control system as specified in claim 5 wherein the circuit means includes demodulator means for amplitude stability.

7. A control system as specified in claim 5 wherein the circuit means includes filter means for minimizing distortion in the excitation voltage.

8. A control system as specified in claim 7 wherein the circuit means include phase shift means for connection to a plurality of field windings.

* * * * *